United States Patent [19]

Ward

[11] 4,036,268
[45] July 19, 1977

[54] WIRE WRAPPING APPARATUS
[76] Inventor: Derek Ward, 11 Tui Vale Road, Auckland, New Zealand
[21] Appl. No.: 671,823
[22] Filed: Mar. 30, 1976
[51] Int. Cl.² .............................................. B21F 15/00
[52] U.S. Cl. .................................... 140/124; 242/7.17
[58] Field of Search ....................... 242/7.17; 140/124; 29/203 H

[56] References Cited
U.S. PATENT DOCUMENTS

| 2,885,764 | 5/1959 | Shulters et al. | 242/7.17 |
| 3,360,808 | 1/1968 | Taysom | 242/7.17 |
| 3,675,861 | 7/1972 | Baker et al. | 242/7.17 |

Primary Examiner—Lowell A. Larson

[57] ABSTRACT

A tool for stripping an insulated wire and/or wrapping the wire around a terminal tag in which a sleeve member has a bit member axially slidable therein and the bit includes a longitudinal aperature adapted to receive a terminal tag; the bit member including an intermediate recess and a groove or channel in the side of the bit member between a free end and said recess; a shearing edge or face substantially adjacent the junction of said groove or channel with said recess; the sleeve member having a second insulating shearing edge or face within the sleeve member, axially at a predetermined distance from the free end of the sleeve member so that the bit member when axially advanced a portion of the recess protrudes beyond the free end of the sleeve member and an insulated wire inserted between the sleeve and the bit stripped of its insulation when the bit is withdrawn axially into the sleeve due to coaction between the shearing edges; the axial movement of the bit partially stripping a predetermined length of insulation from the wire; the longitudinal aperture in the bit member then being engaged by the terminal tag and rotation of the bit member causing the stripping wire to be wrapped around the tag.

15 Claims, 17 Drawing Figures

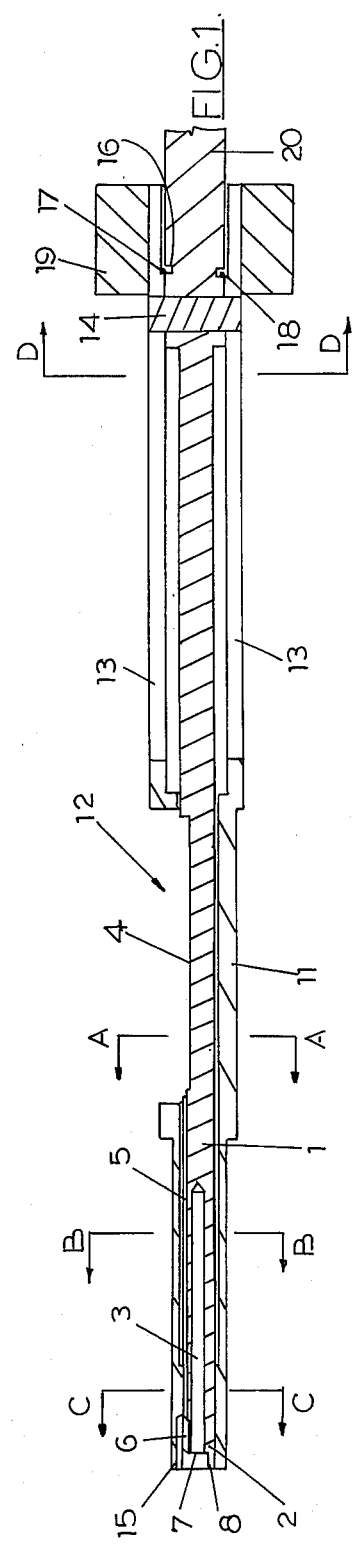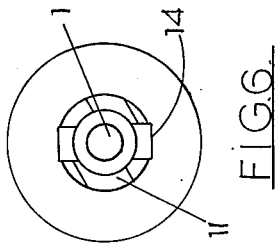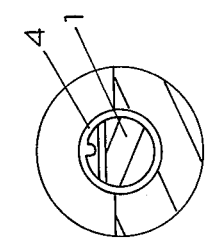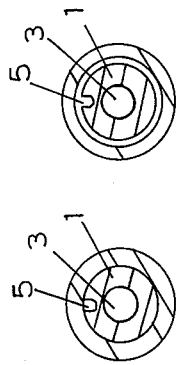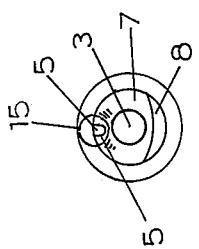

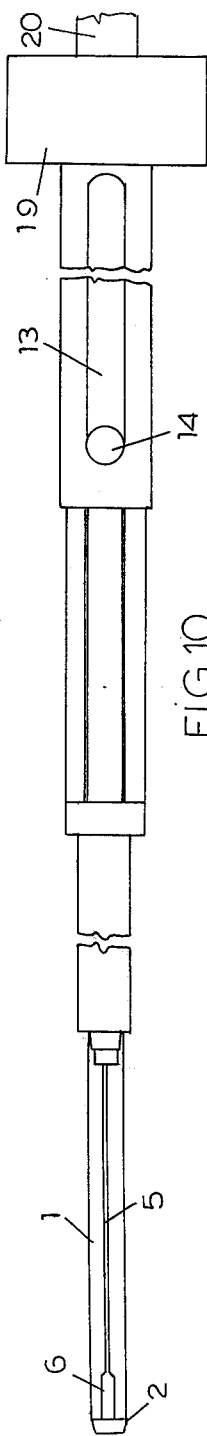
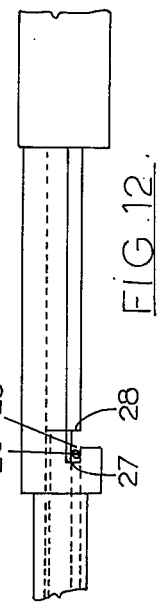
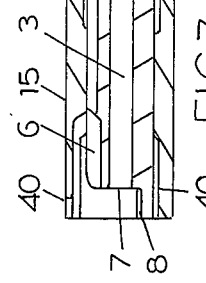
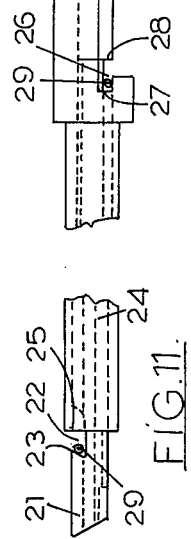
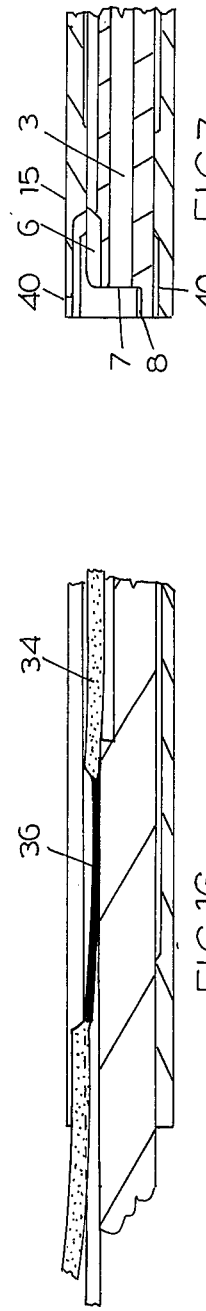

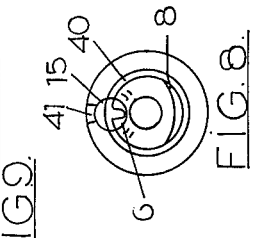
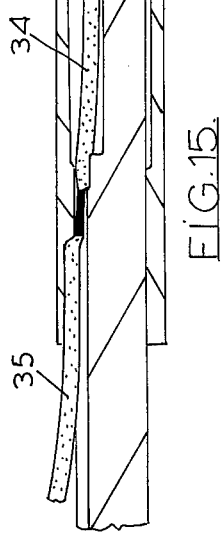
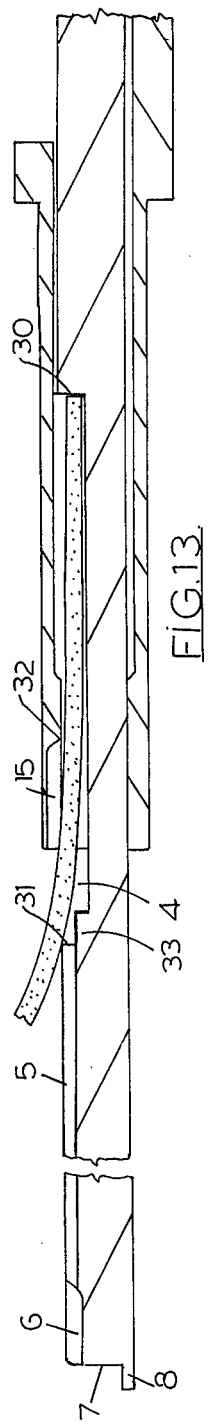
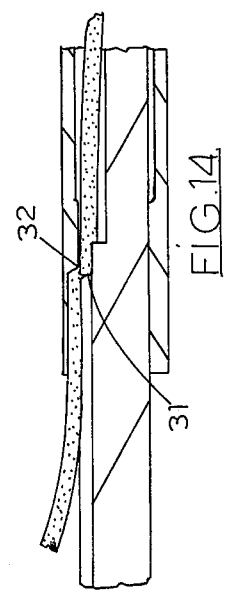
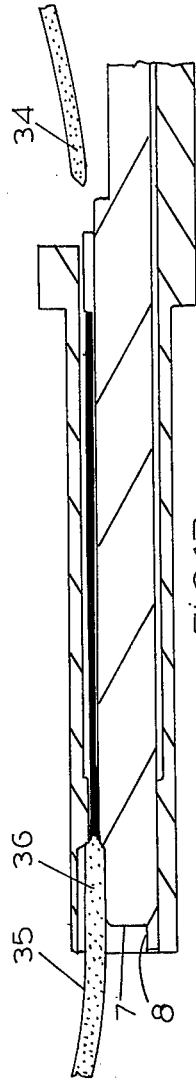

WIRE WRAPPING APPARATUS

FIELD OF THE INVENTION

This invention relates to wire wrapping apparatus and have been devised particularly though not solely for the wrapping of an insulated, single strand, electrical wire around a square or rectangular cross section terminal tag or post.

BACKGROUND OF THE INVENTION

In the past, apparatus used for wire wrapping of terminal tags of the type used in professional electronics has either required that the piece of wire to be wrapped around the tag be cut to length and stripped of insulation along a predetermined length of the wire, or apparatus incorporating stripping and cutting facilities had a large diameter head preventing the use of such apparatus amongst closely placed terminal tags, or wire wrapping apparatus suitable for wrapping fine gauge wire such as 30 gauge wire amongst closely spaced terminal tags has not been able to wrap the wire in a "modified wrap", that is, a wrap in whih the first turn of the wire about the terminal tag retains the insulated covering, or the apparatus is operated in a manner which strips the wire of its insulation during the actual wrapping operation introducing wire stripping forces as an additional variable in the wrapping process.

OBJECTS AND SUMMARY OF THE INVENTION

It is therefore an object of the present invention to provide wire wrapping apparatus which will obviate or minimise the foregoing disadvantages in a simply yet effective manner or which will at least provide the public with a useful choice.

Accordingly, the invention consists in a tool for stripping an insulated wire and/or wrapping the wire around a terminal tag, said tool comprising a sleeve member and a bit member adapted to slide axially within said sleeve member, said bit member having a longitudinal aperture at the free or operative end thereof adapted to receive said terminal tag, a recessed portion in the side of said bit member intermediate of the length thereof, a groove or channel in the side of said bit member between said free end and said recessed portion, and a first insulating shearing edge or face at or adjacent the junction of said groove or channel with said recessed portion, said sleeve member incorporating a second insulating shearing edge or face within said sleeve member axially located a predetermined distance from the free end of said sleeve member, so that in use, upon said bit member being axially advanced, so that at least a part of said recessed portion protrudes from the free end of said sleeve member, an insulated wire is inserted between the said sleeve and said bit and said bit being withdrawn axially into said sleeve causing said first and said second insulation shearing edges to coact with one another to shear or tear the insulation on said wire; said axial movement being continued to at least partially strip a predetermined length of insulation from said wire, said longitudinal aperture in said bit then being engaged with said terminal tag and said bit rotated thereabout causing said wire to wrap about said tag, where, by virtue of said second insulation shearing edge being located a predetermined distance from the end of said sleeve member, a predetermined length of the wire wrapped around the base of said tag retains the insulation covering.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

The invention consists in the foregoing and also envisages constructions of which the following gives examples only.

BRIEF DESCRIPTION OF THE FIGURES OF THE DRAWING

Preferred forms of the invention will now be described with reference to the accompanying drawings in which:

FIG. 1 is a longitudinal cross-section of a wire wrapping tool according to the invention, FIG. 2 is a transverse cross-section to an enlarged scale along the line A—A of FIG. 1, FIG. 3 is a transverse cross-section to an enlarged scale along the line B—B of FIG. 1, FIG. 4 is a transverse cross-section to an enlarged scale along the line C—C of FIG. 1, FIG. 5 is an end view to an enlarged scale of the tool shown in FIG. 1, FIG. 6 is a transverse cross-section along the line D—D of FIG. 1, FIG. 7 is an enlarged fragmentary longitudinal cross-section of the end of an alternative form of wire wrapping tool according to the invention, FIG. 8 is an end view of the wire wrapping tool shown in FIG. 7, FIG. 9 is a plan view of the end of the wire wrapping tool shown in FIGS. 7 and 8, FIG. 10 is a plan view of the wire wrapping tool shown in FIG. 1, showing the bit in the extended position, FIG. 11 is a fragmentary view of a portion of a wire wrapping tool according to the invention showing a wire cutting facility, FIG. 12 is a fragmentary view of a wire wrapping tool according to the invention showing an alternative form of wire cutting facility, and FIGS. 13 to 17 inclusive are a series of longitudinal cross-sectional views of the wire wrapping tool shown in FIG. 1 showing a length of insulated wire inserted into the tool and being progressively stripped by the action of the tool.

DESCRIPTION OF PREFERRED EMBODIMENTS

In one preferred form of the invention a wire wrapping tool particularly suitable for stripping and wrapping fine gauge wire, such as 30 gauge insulated wire, around terminal tage is constructed as follows:

A bit member 1 is provided in the form of a circular cross-section rod having a free end 2 in which a longitudinal hole or bore 3 is formed of such a diameter as to receive a terminal tag. A recessed portion 4 is formed in one side of the bit member at a point intermediate of the length of the bit member. The recessed portion may have a flat base. A groove or channel 5 is formed in the side of the bit member, extending axially between the free end 2 and the recessed portion 4 of the bit member. The groove or channel is sized so to be slightly larger in cross section than the wire core of a length of insulated wire with which the apparatus is intended to be used. At the free end of the bit member the groove 5 is enlarged in diameter at enlarged portion 6 to form a partial cylinder in the side of the bit, the end of the partial cylinder adjacent the groove or slot being merged into the groove by a surface formed to a partial frustum of a cone. The other end of the enlarged portion is radiused tangentially to both the surface of the partial cylinder formed by the enlarged portion of the groove and also to a plane forming the end of the bit member at 7, the plane being substantially perpendicular to the axis of the bit member. The radiused portions ease the 90° turn which a wire being withdrawn from the groove 5 must make as it is wrapped about a terminal tag and help to modify and control the tension in the wire as it is wrapped around the tag.

The end 7 of the rod is provided with a raised portion 8 forming a wiping surface on the end of the bit member, the wiping surface in use coacting with the last portion of wire to be wrapped about the tag to ensure that the end of the wire is properly turned around the tag. The wiping surface is spaced from the edge of the axial hole 3 by an amount designed to allow the wrapped wire to pass between the raised portion and the tag but small enough to enable the wire tail to be turned about the tag.

The bit member 1 is mounted coaxially within a sleeve member 11, the inner diameter of which is slightly greater than the outer diameter of the bit member so that the bit member forms a rotatable and slidable fit within the sleeve member. The sleeve member is provided with an opening 12 axially located so that the opening is adjacent to the recessed portion 4 of the sleeve member when the end of the bit member and the corresponding free end of the sleeve member are substantially aligned. The sleeve member is provided with axial slots 13 and the bit member is provided with a radial pin 14 passing through the bit member and protruding on either side to engage with the axial slots 13 in the sleeve. (Although the tool has been shown with two diametrically opposed axial slots and a pin protruding from both sides of the bit member it will be apparent that a single axial slot could be provided engaged with a pin protruding on only one side of the bit member). In this manner, the bit member is restrained to rotate with the sleeve member while being permitted to slide axially within the sleeve member over a range determined by the length of the slot 13. The length and positioning of the slot 13 is arranged in the sleeve so that when the bit member is advanced axially through the sleeve member, so that the free end 2 of the bit member protrudes as far as possible from the sleeve member (as shown in FIG. 10), then the end of the recessed portion 4 nearer to the free end of the bit member will protrude beyond the free end of the sleeve member.

The free end of the sleeve member is provided with a partial cylindrical recess 15 positioned and located so that the partial cylindrical recess aligns with the enlarged cylindrical groove 6 in the bit member to form a cavity in the form of a complete cylindrical recess of diameter able to receive an insulated wire.

The bit member may be provided with a circumferential groove 16 in which is engaged a circlip 17 adapted to bear against a small shoulder or ridge 18 formed in the inner bore of the sleeve member. The circlip, in conjunction with the ridge 18, provided a "click into position" action when the bit is moved axially relative to the sleeve so that the bit may be accurately axially retained within the sleeve in the position shown in FIG. 1.

The bit member is mounted by the shaft 20 into a convenient holding handle or other support means (not shown), or drive means may be provided adapted to rotate the bit member and hence also to rotate the sleeve member by way of pin 14. The drive means may be provided in various forms, for example, the drive means (not shown) may be an electric motor or alternatively some form of manually operated drive means such as a squeeze trigger working through a gear train to rotate the sleeve member may be provided. It is a feature of the wire wrapping tool, according to the invention, that because of the simple construction of the tool, the tool is particularly suitable for use as a hand tool provided with a simple screw driver type handle which may, for example, be fastened to the protruding end portion 20 of the bit member and the sleeve member operated axially on the bit member by hand operation on the collar 19. Alternatively, the operating handle may be fastened to the sleeve member and the pin 14 provided in a longer form engaged with a collar (not shown) so that axial movement of the collar will move the pin 14 axially within the slot 13 and so operate the bit axially relative to the sleeve.

As an additional feature of the wire wrapping tool, wire cutting members may be provided on the tool in various alternative configurations, two forms of which are shown in FIG. 11 and FIG. 12 respectively. In FIG. 11, the bit member 21 is provided with a recessed notch 22 having a sharp edge 23 and a wire 29 is layed across the sharp edge so that the wire passes through the recessed portion and radially beyond the sleeve 24. When the bit is withdrawn into the sleeve, the edge 23 of the recess coacts with the end 25 of the sleeve to shear the wire in a known manner. Alternatively (FIG. 12), the sleeve may be provided with a recessed notch 26 having a sharp edge 27 adapted to coact with an edge 28 on a recessed portion in the bit member. In this configuration, the wire 29 placed as before is sheared by axial movement of the bit moving outwardly from the sleeve member.

OPERATION

The operation of the apparatus to effect the stripping and wrapping of the end of a length of insulated wire around a terminal tag, mounted, for example, on a mounting board will now be described;

The bit member 1 is advanced axially through the sleeve member until the locating pin 14 abuts the forward end of the slot 13 so that the recessed portion 4 of the bit member protrudes from the free end of the sleeve member as shown in FIG. 10. The end of a length of insulated wire is then inserted into the aperture formed between the recessed portion of the bit member and the inner bore of the sleeve member, and advanced into the aperture until the wire abuts the far end 30 of the recessed portion as shown in FIG. 13. The bit member is then drawn axially into the sleeve member until the insulated wire becomes wedged between the end 31 of the axial groove or slot in the bit member and the external corner edge 32 at the base of the enlarged bore formed in the sleeve member. Because of the sharp edged nature of the termination of the groove 5 with the recess portion 4 of the bit member, the edges of the groove form a first insulation shearing edge at the junction of the groove with the recessed portion. In a similar manner, the sharp exterior corner at the junction of the enlarged bore 15 in the sleeve and the remainder of the sleeve at 32, forms a second insulation shearing edge within the sleeve located a predetermined distance from the free end of the sleeve as will be described further later. It has been found desirable to provide the recessed portion of the bit with a small step 33, adjacent the junction between the groove 5 and the recessed portion 4, in order to support the wire at this location during the stripping operation to help prevent the core of the wire becoming nicked or cut by the sharp edges at the first insulation shearing edge 31.

As the bit member is further withdrawn into the sleeve member, the first insulation shearing edge 31 coacts with the second insulation shearing edge 32 to tear or shear the insulation surrounding the wire until the end portion of the insulation 34 is torn and removed from the remainder of the insulation 35 on the wire. As the bit is further withdrawn into the sleeve, the stripped portion 36 of the wire is pulled out from the end portion 34 of the insulation (FIG. 16) until eventually when the bit is completely withdrawn into the sleeve, as shown in FIG. 17, the bared wire is completely withdrawn from the end portion of insulation.

The distance between the far end of the recessed portion 30 and the end 31 of the groove 5 determines how far along the wire the insulation is sheared; in the preferred form of the invention the recessed portion and groove 5 are dimensioned to enable the end portion of the insulation to be completely removed from the wire during the stripping movement. It is of course possible to construct a tool dimensioned so that the wire is only partially stripped from the end portion of insulation during the stripping movement, the remainder of the wire being withdrawn from the end portion during the wrapping process as will be described further later.

The tool with the wire located in the position shown in FIG. 17 may then be engaged with a terminal tag by inserting the terminal tag in the central longitudinal aperture 3. Because the portion of wire 35 is arranged to protrude axially from the end of the tool, and because the portion 36 remaining within the tool is supported by the sides of the cylindrical cavity formed by the enlarged cylindrical portion 6 in the bit member and the partial cylinder cavity 15 in the sleeve member, the wire protruding from the end of the tool is restrained to follow the axial line of the tool so that when the wire is bent along the surface of the board mounting the terminal tag, there is a downward force on the wire guiding the wire towards the mounting board and so preventing the protruding portion of the wire from bending radially to become entangled with the tool during the wrapping operation.

Once the longitudinal aperture 3 has been placed over the terminal tag about which the wire is to be wrapped, the tool is rotated by way of any of the drive means, above described, causing the wire to be withdrawn from the tool and wound around the terminal tag. Because the second insulation cutting edge 32 is located a predetermined distance from the free end of the sleeve, a portion of insulated wire is retained within the tool before wrapping and this portion of insulating wire forms a turn or a number of turns of insulated wire about the base of the terminal tag before the stripped portion of the wire is wrapped thereabout. The number of turns of insulated wire is of course determined by the length between the free end of the sleeve and the second insulation shearing edge 32, but is preferably designed so as to give a one and a half turns of insulated wire about the base of the terminal tag, this form of wrap being commonly known as "modified wrap". The tool is rotated until the entire length of stripped wire is withdrawn from the groove 5 and wrapped around the tag, the end portion of the wire being wrapped into close contact with the tag by the wiping surface 8 formed on the up-standing portion at the end of the bit.

Because the mouth of the enlarged bore 6 is a radiused in all directions relative to the end surface 7 of the bit, the wire is curved over the radiused portion as it is withdrawn from the tool during the wrapping operation and the degree of radiusing effects the tension placed upon the wire to control the tightness of the wrap about the terminal tag. In order to provide an even pressure downwardly on the wrapped turns as wrapping is effected to maintain an even wrap about the tab, the sleeve member may be axially spring loaded (not shown) relative to the mounting handle so that as the stripped wire is wound about the terminal tag, the big member and sleeve member are allowed to ride axially upward away from the mounting board under a controlled spring pressure to assist in the formation of even coil of wire about the terminal tag.

To assist in locating and retaining the free end of the wire relative to the mounting board while the wire wrapping operation is taking place, a further outer sleeve (not shown) may be mounted coaxially exteriorly to the sleeve 11 and fixed to the support handle of the drive apparatus so that the exterior sleeve does not rotate during the wrapping. The free end of the exterior sleeve will protrude slightly beyond the free end of the sleeve 11 and is provided with a retaining fork at the end of the outer sleeve adapted to receive the protruding length of insulated wire 35 between the prongs of the fork. In use, the end of the fork is placed over the length of insulated wire protruding from the bit and along the mounting board so as to hold the wire firmly against the mounting board during the wrapping operation.

It will be apparent from the nature of the invention that the head of the wire wrapping tool may be made in an extremely compact form i.e. having a small diameter, so that the bit is suitable for wrapping terminal tags which are spaced apart at centres as small as one tenth of an inch. This feature makes the tool particularly applicable for use on sophisticated electronic equipment using components such as integrated circuits which may be interconnected using closely spaced terminal tags. Further, through the cylindrical nature of the sleeve 11, particularly in the end portion of the sleeve adjacent to the free end of the tool, i.e. there being no larger cut-outs in the sleeve or protrusions from the sleeve, the tool is particularly robust in spite of the small diameter of the wrapping head of the tool. It is also an advantage that because the second shearing edge 32 is recessed within the sleeve, in order to effect a "modified wrap", the shearing edge is protected from accidental knocking or chipping and therefore retains the sharp shearing edge for a long time.

The apparatus as described for stripping and wrapping wires with thin or tough insulation and particularly wires such as 30 gauge wires with a thin central core has the added advantage that because the stripping and wrapping operations are separated i.e. the stripping being achieved first during axial movement and then the wrapping being achieved by rotating the tool, and due to the nature of the stripping operation as above described, there is a minimum of force on the wire core during stripping. Similarly the stripping forces are not a factor in the wrapping operation. This feature enables very delicate wires to be stripped and wrapped using this apparatus.

Although preferred forms of the tools have been described, it will be apparent that various alternative configurations of the tool may be provided while yet retaining the essential features of axial stripping and incorporating a recessed second insulation shearing edge to give a modified wrap. For example, in one alternative configuration, the sleeve 11 may be fixed so that it does not rotate during wrapping and the bit 1 arranged to rotate within the sleeve. In this configuration, the method of engagement of the pin 14 with the slot 13 is of course changed so that the bit is able to rotate within the sleeve after the stripping operation has been achieved. To this end, the slot 13 in the sleeve may be formed as an axial depression on the interior of the sleeve and extended to a circumferential groove at the location of the pin desired for wrapping. In this manner the bit may be circumferentially located accurately relative to the sleeve during the stripping operation but yet allowed to rotate within the sleeve for the wrapping operation. In this configuration (shown in FIGS. 7, 8, and 9), the interior of the free end of the sleeve is provided with an enlarged bore 40 to give sufficient clearance for the wire to rotate with the bit within the sleeve during the wrapping operation. It is convenient in this configuration that the sleeve be provided with a notch 41 at the end of the sleeve to act in a similar manner to the wire retaining fork above described to locate the insulated wire on the mounting board during the wrapping operation.

Although one particular configuration of the free end of the bit has been described, other configurations are equally possible, for example, the end of the bit may be formed to a sloping surface and preferably a flat surface sloping at substantially 45° to the axis of the bit. In this configuration it is preferably that the groove 5 emerges from the end of the bit at the edge of the sloping face furthest removed from the end of the bit and that the upstanding wiping surface 8 be formed at the more forward edge of the sloping face. The 45° face on the bit is simple to form in the manufacture of the tool and also, by virtue of the sloping surface, provides a camming action on the wire during the wrapping to force the wire inwardly towards the tag and downwardly against the next previously wrapped turn of wire.

I claim:

1. A tool for stripping an insulated wire and/or wrapping the wire around a terminal tag, said tool comprising a sleeve member and a bit member adapted to slide axially within said sleeve member, said bit member having a longitudinal aperture at the free or operative end thereof adapted to receive said terminal tag, a recessed portion in the side of said bit member intermediate of the length thereof, a groove-channel means in the side of said bit member between said free end and said recesses portion, and a first insulating shearing means substantially at the junction of said groove-channel means with said recessed portion, said sleeve member incorporating a second insulating shearing means within said sleeve member axially located a predetermined distance from the free end of said sleeve member so that in use, upon said bit member being axially advanced, so that at least a part of said recessed portion protrudes from the free end of said sleeve member an insulated wire is inserted between the said sleeve and said bit and said bit withdrawn axially into said sleeve causing said first and said second insulation shearing means to coact with one another to rupture the insulation on said wire, said axial movement being continued to at least partially strip a predetermined length of insulation from said wire, said longitudinal aperture in said bit then being engageable with said terminal tag and said bit rotated thereabout causing said wire to wrap about said tag, where, by virtue of said second insulation shearing means being located a predetermined distance from the end of said sleeve member, a predetermined length of the wire-wrapped around the base of said tag retains the insulation covering.

2. A tool as claimed in claim 1 wherein said predetermined length of insulated wire wrapped about the base of said tag comprises at least one turn of insulated wire about said tag.

3. A tool as claimed in claim 1 wherein said groove channel means corresponds in width to the diameter of the core of said wire.

4. A tool as claimed in claim 1 wherein said second insulation shearing edge is formed in said sleeve member by a corner between an interior surface of said sleeve and a cavity formed jointly between said bit member and said sleeve member at the end of said groove-channel means in said bit member adjacent the free end of said tool, said cavity comprising an apertured portion formed between said sleeve member and said bit member substantially coaxial with said groove-channel means.

5. A tool as claimed in claim 1 wherein said sleeve member includes means integrating it with said bit so that the sleeve member is adapted to rotate with said bit member as said wire is wrapped around said tag.

6. A tool as claimed in claim 1 wherein said bit member includes means so that the bit member is adapted to rotate within said sleeve member during wrapping of said wire.

7. A tool as claimed in claim 5 wherein guide surfaces for said wire are provided substantially adjacent the free end of said bit, arranged so as to restrain said wire protruding in use from said free end of said tool to follow a line substantially parallel to the axis of said tool, said guide surfaces being provided by the walls of said cavity.

8. A tool as claimed in claim 6 wherein guide surfaces for said wire are provided substantially adjacent the free end of said bit, arranged so as to restrain said wire protruding in use from said free end of said tool to follow a line substantially parallel to the axis of said tool, said guide surfaces being provided at least partially by an enlarged portion at the free end of said channel-groove means and a cylindrical wall of the enlarged portion of the internal diameter of said sleeve is defined by a step portion.

9. A tool as claimed in claim 1 including means wherein said bit is restrained from rotating relative to said sleeve at least during an initial part of the stripping operation, said means comprising a radial pin protruding from said bit and engaging an axial slot-recess means in said sleeve.

10. A tool as claimed in claim 9 wherein said axial slot-recess means in said sleeve is open-ended and of such length that said radial pin disengages from said open end of said slot-recess means during said axial stripping motion to permit said bit to rotate relative to said sleeve.

11. A tool as claimed in claim 1 wherein said sleeve member comprises a continuous cylindrical sleeve over at least the portion of said sleeve member adjacent the free end of said tool.

12. A tool as claimed in claim 1 wherein said bit member is shaped at the free end thereof to a surface sloping relative to the axis of said bit, said sloping surface being a substantially flat surface arranged at substantially 45° to the axis of said bit.

13. A tool as claimed in claim 12 wherein said sloping face is provided with an upstanding wiping surface.

14. A tool as claimed in claim 4 wherein the free end of said bit member includes radius portions tangential to both the end of said bit member and to the walls of said cavity.

15. A tool as claimed in claim 1 including wire cutting means on coacting portions of said bit and said sleeve.

* * * * *